United States Patent [19]
Fagan et al.

[11] Patent Number: 5,698,099
[45] Date of Patent: Dec. 16, 1997

[54] HYDRODYNAMIC SEPARATOR WITH AN INCORPORATED SOLIDS INTERCEPTOR

[75] Inventors: Garry William Fagan, Bristol; Timothy John Lamb, Clevedon, both of United Kingdom

[73] Assignee: Hydro International plc, Clevedon, United Kingdom

[21] Appl. No.: 632,496

[22] PCT Filed: Oct. 25, 1994

[86] PCT No.: PCT/GB94/02345

§ 371 Date: May 21, 1996

§ 102(e) Date: May 21, 1996

[87] PCT Pub. No.: WO95/11735

PCT Pub. Date: May 4, 1995

[30] Foreign Application Priority Data

Oct. 25, 1993 [GB] United Kingdom ............... 9321963

[51] Int. Cl.⁶ ............... B01D 29/00; C02F 1/40
[52] U.S. Cl. ............... 210/304; 210/295; 210/532.1; 210/538
[58] Field of Search ............... 210/295, 304, 210/532, 538

[56] References Cited

U.S. PATENT DOCUMENTS 4,801,377   1/1989   Bolt ............... 210/162

FOREIGN PATENT DOCUMENTS

| 3 837 638 | 5/1990 | Germany. |
|---|---|---|
| 42 37 201 | 5/1994 | Germany. |
| 2 082 941 | 8/1980 | United Kingdom. |
| 2 223 958 | 4/1990 | United Kingdom. |
| 2 245 504 | 8/1992 | United Kingdom. |
| 0 397 864 | 11/1990 | WIPO. |
| 92/21837 | 12/1992 | WIPO. |
| 93/24201 | 12/1993 | WIPO. |

OTHER PUBLICATIONS

PTO 96-5903: Translation of Geramn Document DE 42 37 201 A1, May 1994.

Primary Examiner—David A. Reifsnyder
Attorney, Agent, or Firm—Larson & Taylor

[57] ABSTRACT

A hydro-dynamic separator incorporating a solids interceptor (21) upstream of the overflow (19) for intercepting solid matter above a predetermined size entrained in liquid flowing towards the overflow (19), the solids interceptor (21) comprising: (a) a wall (51) terminating in an upper edge (51a) which constitutes a weir in the flow path of liquid flowing to the overflow (19); (b) a barrier (53), extending from the said wall (51) towards a solids collection region (55), said barrier (53) comprising a plurality of openings (69) to permit flow of liquid therethrough but to retain solids, the upper surface of the barrier (53) being disposed such that solids retained on the barrier (53) are washed across the surface by the flow of liquid towards the solids collection region (55); and (c) a liquid collection region (59) beneath the barrier (53) for collecting liquid flowing through the openings (69) in the barrier (53), said liquid collection region (59) being in fluid communication with the overflow (19) of the separator.

15 Claims, 9 Drawing Sheets

HYDRODYNAMIC SEPARATOR WITH AN INCORPORATED SOLIDS INTERCEPTOR

This invention relates to apparatus or equipment for separating solids from a liquid/solid mixture.

Our British Patent Application No. 9223079.6 (and corresponding International Patent Application No. PCT/GB93/01100) relate to an apparatus for separating solids from a liquid/solid mixture comprising:

(i) a barrier comprising a series of generally parallel longitudinal elements which define between them openings to permit flow of liquid through the barrier, each of the said elements, over a substantial portion of its length, having a cross-section comprising an enlarged head region having a smooth arcuate surface which narrows to a restricted lower body portion, the longitudinal elements additionally defining an upper surface of the barrier onto which, in use, the liquid mixture for separation is introduced, the said upper surface of the barrier being downwardly inclined towards a free edge which extends along at least one side of the barrier, which downward inclination is chosen such that solids retained on the barrier are washed down the surface by the liquid mixture as it is introduced onto the surface; and (ii) a solids collection region provided below the said free edge of the barrier for collecting solid matter washed down the inclined upper surface of the barrier.

This prior art apparatus may be connected to the overflow of a hydro-dynamic separator in order to separate from the liquid phase emerging from the separator those neutrally buoyant materials which escape separation.

According to a first aspect of the present invention, there is provided a hydro-dynamic separator incorporating a solids interceptor upstream of the overflow for intercepting solid matter above a predetermined size entrained in liquid flowing towards the overflow, the solids interceptor comprising:

(a) a wall terminating in an upper edge which constitutes a weir in the flow path of liquid flowing to the overflow;

(b) a barrier, extending from the said wall towards a solids collection region, said barrier comprising a plurality of openings to permit flow of liquid therethrough but to retain solids, the upper surface of the barrier being disposed such that solids retained on the barrier are washed across the surface by the flow of liquid towards the solids collection region; and (c) a liquid collection region beneath the barrier for collecting liquid flowing through the openings in the barrier, said liquid collection region being in fluid communication with the overflow of the separator.

The barrier is preferably in the form of an annulus. This annular barrier may be arranged such that flow across the barrier surface is either radially inward or radially outward.

When the flow is to be radially outward, the said wall is an inner peripheral wall and flow emerges centrally of the annular barrier and passes over the wall onto the barrier thereby washing solids towards a solids collection region in communication with an outer, downstream edge of the barrier. This solids collection region may be in the form of an annular channel disposed around the downstream edge of the barrier and leading to an outlet which conveys the solids and associated liquid away from the separator; the floor of the annular channel may be sloped towards the outlet thereof. The solids collected may be dewatered in a conventional dewatering device such as a so-called "Franclon screen" as described in GB-A- 2247186.

When the flow is to be radially inward, the wall is provided as an outer peripheral wall from which the barrier extends inward towards a central solids collection region.

The outer peripheral wall may be a continuous circular wall, or may be a part circular wall. The central solids collection region may comprise a simple opening which communicates with a downwardly extending duct for the continuous disposal of the collected solids. Alternatively, the solids collection region may communicate with a receptacle which is emptied periodically.

The upper surface of the barrier may be downwardly inclined towards the solids collection region and the angle of inclination of the upper surface of the barrier is chosen such that, as the liquid mixture is introduced onto the upper surface of the barrier, in use, the solids accumulating on the surface are washed down the incline towards the solids collection region from where they are removed either continuously or periodically. The downward inclination of the said upper surface of the barrier may be up to 45° to the horizontal, although it should be appreciated that a suitable inclination for a desired installation should be determined empirically, to suit the particular characteristics of the liquid/solid mixture being treated. It should also be mentioned here that the upper surface of the barrier may be horizontal, if the flow of liquid is strong enough to wash solids towards the solids collection region. It is self-evident that the upper surface should be free from any obstructions which will tend to interfere with the downward washing of the solids.

In one embodiment of the invention, the liquid barrier comprises a series of longitudinal elements each extending from the said wall towards an end region disposed adjacent the solids collection region, the said elements defining openings between them for flow of liquid through the barrier. Where the barrier is in the form of an annulus, the elements are disposed radially. Each of the elements may, over a substantial portion of its length, have a cross-section comprising an enlarged head region having a smooth arcuate surface which narrows to a restricted lower body portion.

In this embodiment, it has been found that when the longitudinal fingers have a cross-section comprising an enlarged head region having a smooth arcuate surface narrowing to a restricted lower body region, this greatly reduces the tendency for the barrier to block or "blind", particularly when the solid matter in the solid/liquid mixture contains elongate, plastic components such as condoms. The cross-section reduces the likelihood that these contaminating solids become bound to the longitudinal elements. The enlarged head region of the longitudinal elements may be hollow and be provided with an extension member which is received in the hollow space and which is capable of being extended to increase the effective length of the element.

In this first embodiment, the openings between the elements are dimensioned to retain on the upper surface of the barrier solid matter in the liquid mixture above a predetermined size.

The ends of the longitudinal elements are preferably not secured directly to each other. The longitudinal elements are preferably supported at their fixed ends by the said wall of the interceptor.

The longitudinal elements may all be of approximately the same length although it is to be appreciated that the length of the longitudinal elements could vary, for instance to allow differential separation of differently-sized solid materials.

In a second embodiment of the invention, the barrier is in the form of a perforated plate. This perforated barrier is preferably annular and downwardly sloping towards the solids collection region. The size, shape and disposition of the perforations, as well as the free open area of the barrier (defined as the area of the openings divided by the area of the barrier), should be determined empirically by the skilled person, depending upon the intended function of the solids interceptor, and particularly the volume of liquid to be handled and the size of solids to be retained. Typically, however, in the water treatment industry, the perforations will be arranged in a regular pattern, be generally circular and will have a diameter up to 10 mm; the free area will normally be between 15 and 75%. It has been found to be advantageous for a short zone (for example up to 10 cm) of the barrier immediately adjacent the wall to be free from perforations altogether to allow the flow to settle after it has passed over the wall. It has also been found to be beneficial if the upper edge of the wall terminates in a bead having an arcuate surface.

It is within the scope of the present invention for more than one solid interceptor to be provided in parallel, in the flow path towards the overflow. For example, a first solids interceptor in the form of an inwardly discharging annulus (as per the first aspect of this invention) having a peripheral outer wall may be provided about the axis of the separator, with a second interceptor (as per the second aspect of the invention), concentric with the first, being provided in the form of an outwardly discharging annulus having an inner peripheral wall concentric with the outer peripheral wall of the first interceptor to define an annular passage up which liquid in the separator vessel rises before flowing onto one or other of the barriers.

The liquid which passes through the openings in the barrier (other than that which is associated with the solids material washed to the solids collection region), is collected in the liquid collection region, separately from the solids which have been separated from the liquid/solid mixture, from where it is conveyed to the overflow of the separator.

The "hydro-dynamic separator" is a well known device for separating components of a fluid mixture (see, for example, GB-A-2082941, GB-A-2158741, GB-A-2189413, GB-A-2223958, GB-A-2223957, GB-A-2241904). It is essentially a gravitational separator and relies on the matter which is to be separated to be settleable under gravity (or floatable, in which case it is trapped in a suitable floatables trap).

A typical hydro-dynamic separator to which a solids interceptor may be fitted in accordance with the present invention comprises:

(a) a vessel having a cylindrical outer wall and a base at one end, (b) a body which is provided within the vessel and which defines with the base an annular opening spaced from the outer wall, (c) an annular dip plate in an upper region of the vessel and spaced from the outer wall of the vessel for stabilising flow patterns in the vessel, (d) a horizontal baffle oriented axially of the vessel and situated inwardly of the dip plate above the said body and defining an annular gap between the dip plate and the baffle for the passage of fluid towards the overflow, (e) a vessel inlet (normally tangential) for introducing the liquid mixture into the vessel, (f) an overflow in communication with an upper region of the vessel for removing from the vessel a treated liquid, and (g) a solids collection region centrally disposed of the base for collecting solid matter separated from the liquid mixture.

The arrangement of the components of the hydro-dynamic separator is such that, in use with a circulating flow of liquid and solid matter within the vessel which is of sufficiently low energy that any separation of the solid components of the liquid in the vessel is brought about primarily by gravity, there is created a stabilised shear zone in the circulating liquid between an outer, relatively fast circulating region and an inner, relatively slowly circulating region and there is caused an inward sweeping effect of solids accumulated at the base of the vessel towards the said annular opening.

Hydro-dynamic separators of the type described above may be employed in a method of separating from a liquid mixture a solid component of that mixture which method comprises:

(i) introducing the liquid mixture into the inlet of the hydro-dynamic separator;

(ii) causing a circulating flow of the liquid mixture within the vessel, said circulating flow being of such that any separation of the solids components of the liquid in the vessel is brought about primarily by gravity and there is created a stabilised shear zone in the circulating liquid between an outer, relatively fast circulating region and an inner, relatively slowly circulating region and there is caused an inward sweeping effect of any solids accumulated at the base of the vessel towards the said annular opening low energy rotational motion in the vessel; and (iii) permitting solids to settle under gravity and be concentrated at the solids collection region.

According to a second aspect of the invention, there is provided a solids interceptor for intercepting solid matter above a predetermined size entrained in a liquid flow, comprising:

(i) a barrier provided with an array of perforations onto which, in use, the liquid flow is introduced, the upper surface of the barrier extending towards an edge region from which solids retained on the barrier are washed by the liquid as it flows across the said surface;

(ii) a solids collection region provided below the said free edge of the barrier for collecting solid matter washed across the upper surface of the barrier; and (c) a liquid collection region beneath the barrier for collecting liquid flowing through the openings in the barrier.

The barrier is preferably in the form of an annulus. This annular barrier may be arranged such that flow across the barrier surface is either radially inward or radially outward.

The upper surface of the barrier may be downwardly inclined towards the solids collection region and the angle of inclination of the upper surface of the barrier is chosen such that, as the liquid mixture is introduced onto the upper surface of the barrier, in use, the solids accumulating on the surface are washed down the incline towards the solids collection region from where they are removed either continuously or periodically. The downward inclination of the said upper surface of the barrier may be up to 45° to the horizontal, although it should be appreciated that a suitable inclination for a desired installation should be determined empirically, to suit the particular characteristics of the liquid/solid mixture being treated. It should also be mentioned here that the upper surface of the barrier may be horizontal, if the flow of liquid is strong enough to wash solids towards the solids collection region. It is self-evident that the upper surface should be free from any obstructions which will tend to interfere with the downward washing of the solids.

The size, shape and disposition of the perforations, as well as the free open area of the barrier (defined as the area of the openings divided by the area of the barrier), should be determined empirically by the skilled person, depending upon the intended function of the solids interceptor, and particularly the volume of liquid to be handled and the size of solids to be retained. Typically, however, in the water treatment industry, the perforations will be arranged in a regular pattern, be generally circular and will have a diameter up to 10 mm; the free area will normally be between 15 and 75%.

The solids interceptor of this aspect of the invention may be employed in other types of solid/liquid separator which produce a liquid stream which is still contaminated with solid material.

For a better understanding of the present invention, and to show how the same may be carried into effect, reference will now be made, by way of example only, to the accompanying drawings in which.

Figure 1:
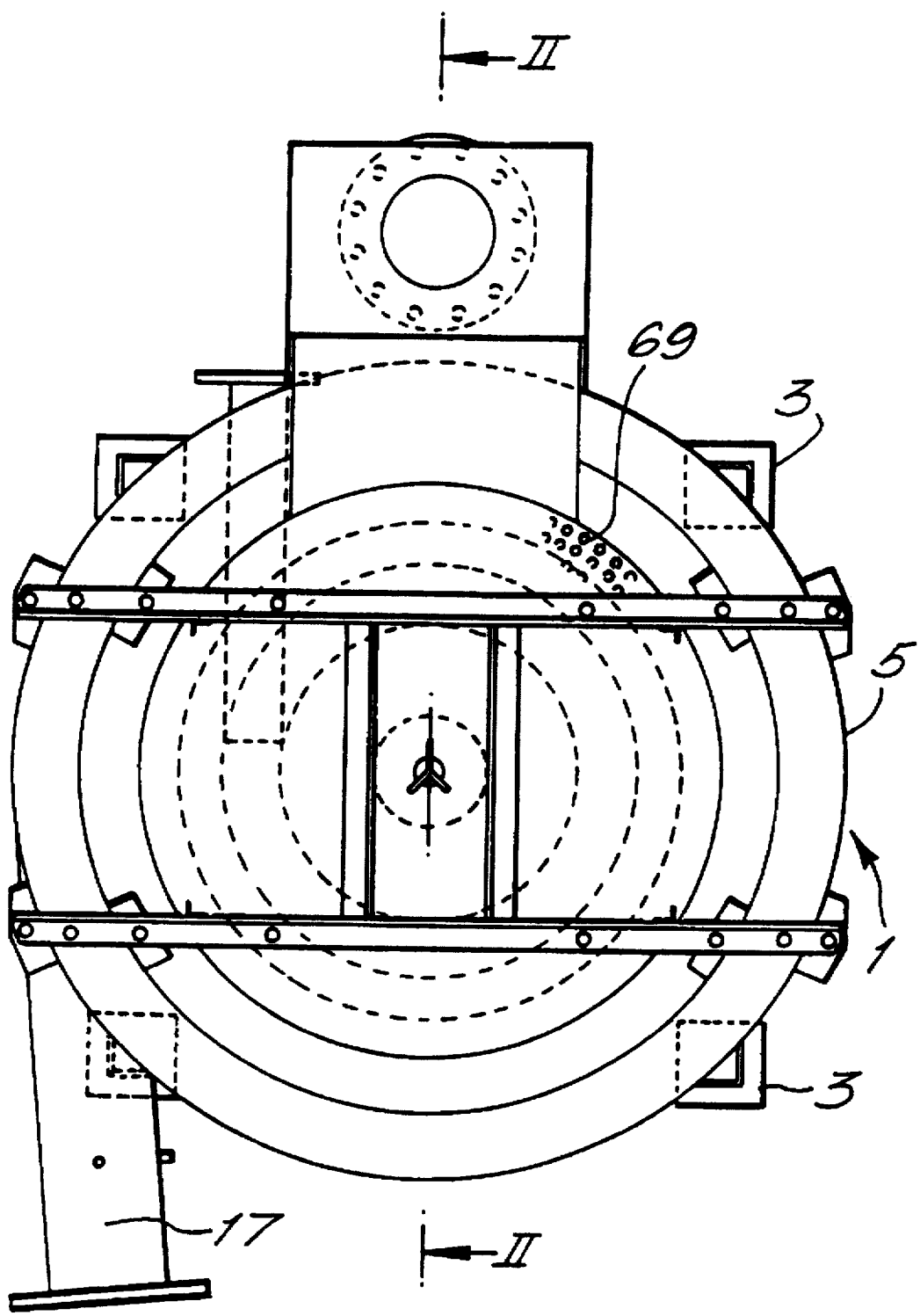
FIG. 1 is a plan view of a hydro-dynamic separator in accordance with the present invention.
Figure 2:
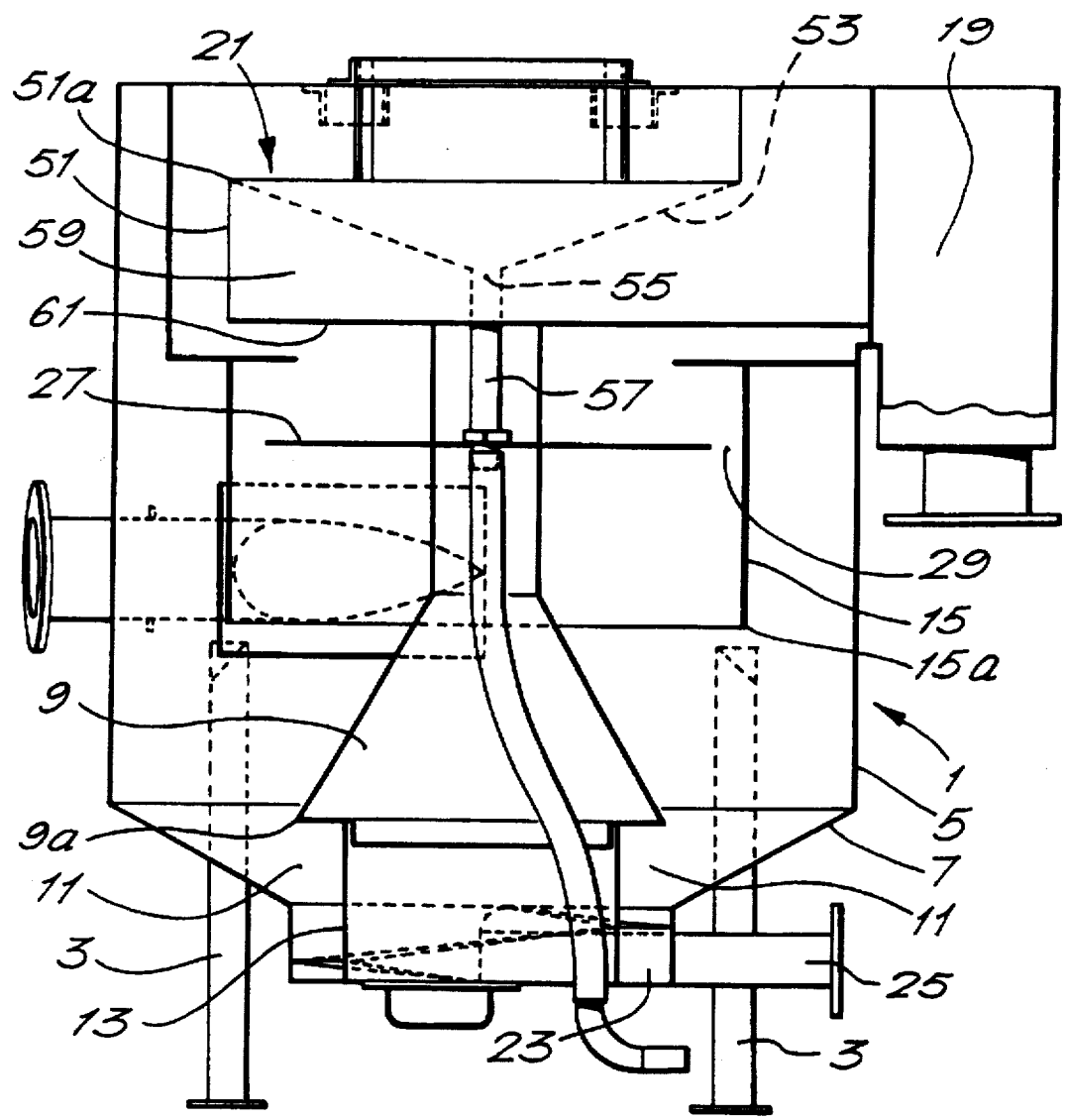
FIG. 2 is a cross-section on the line II—II in FIG. 1.

The hydro-dynamic separator shown in FIGS. 1 and 2 is conventional apart from the arrangement in the top of the vessel. The separator comprises a vessel 1 supported on legs 3. The vessel 1 has a cylindrical outer wall 5 and a sloping base 7 at one end. A conical body 9 is provided axially within the vessel 1 having a lower peripheral edge 9a which defines with the base 7 an annular opening 11 spaced from the outer wall 5. The body 9 is supported by a column 13 standing on the base 7. Projecting downwardly, from an upper region of the vessel 1, and spaced from the outer wall 5 thereof, is provided an annular dip plate 15 for stabilising flow patterns in the vessel 1; the dip plate terminates in a bottom edge 15a. A tangential vessel inlet 17 is formed as an opening in the outer wall 5 of the vessel 1 for introducing liquid mixture into the vessel 1. The separator has an overflow 19 in communication with the vessel 1, via an interceptor 21 in accordance with the invention, for removing from the vessel 1 a treated liquid. A solids collection region 23 or sump is centrally disposed of the base 7 around the bottom of the column 13 for collecting solid matter separated from the liquid mixture. The sump 23 is provided with an outlet pipe 25 for removal of settled solids. A horizontal circular baffle 27, oriented axially in the vessel, is situated inwardly of the dip plate 15, above the conical body 9. An annular gap 29 is provided between the dip plate 15 and baffle 27 for the passage of fluid to the overflow 19.

Operation of the hydro-dynamic separator is as follows. A liquid mixture comprising solid matter is introduced into the vessel 1 via the tangential inlet 17. The arrangement of the components of the separator is such that, in use with a circulating flow of liquid and solid matter within the vessel 1 which is of a low energy in order that any separation of the solids component of the liquid in the vessel is brought about primarily by gravity, there is created a stabilised shear zone in the circulating liquid between an outer, relatively fast circulating region and an inner, relatively slowly circulating region and there is caused an inward sweeping effect of solids accumulated at the base of the vessel towards the said annular opening 11. In particular, the lower peripheral edge of the body 9a in the vessel and the bottom edge of the dip plate 15a define in use of the separator a shear zone and it is this shear zone which is important to the successful, stable operation of the separator of this invention. As fresh liquid to be treated is introduced into the vessel 1, treated liquid is forced to pass through the annular gap 29 between the baffle 27 and dip plate 15, and from there it passes into an upper region of the vessel and then to the overflow 19 via the solids interceptor 21. Solid material arriving in the sump 23 is removed via the outlet pipe 25.

Figure 4:
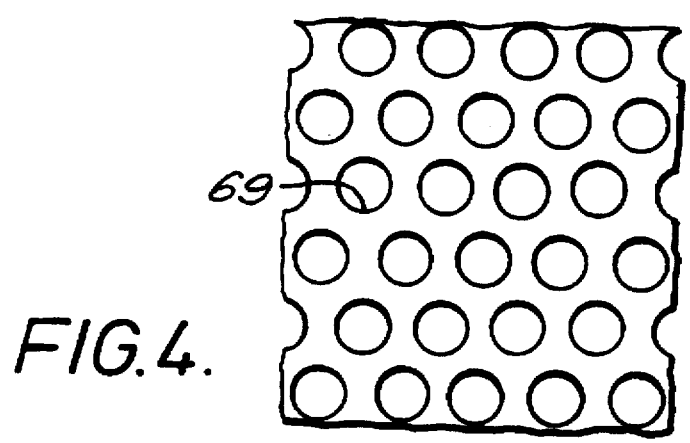
FIG. 4 shows the perforation pattern of a preferred separating barrier for use in the present invention.

Thus, material which is either settleable or floatable, i.e. material which has a density different from that of the liquid, is removed by the separator in a conventional way. In accordance with the invention, a solids interceptor 21 is disposed upstream of the overflow 19 for intercepting neutrally buoyant solid matter above a predetermined size entrained in liquid flowing towards the overflow 19. The solids interceptor 21 comprises an outer peripheral wall 51 which terminates in an upper edge 51a which constitutes a weir in the flow path of liquid flowing to the overflow 19. Extending inward from the outer peripheral wall 51 there is provided a perforated barrier means 53. (Part of the surface of the barrier 53 is shown in FIG. 4.) The upper surface of the barrier 53 is downwardly inclined towards a central solids collection region 55 which communicates with an outlet duct 57 which discharges through the base 7 of the vessel. A liquid collection region 59 is provided beneath the barrier 53 bounded by the outer peripheral wall 51 and a floor 61. The liquid collection region 59 is in fluid communication with the overflow 19 of the separator. In this embodiment, the outer peripheral wall 51 is not fully circumferential in order to provide an opening 63 the full height of the wall 51 for discharge of fluid from the liquid collection region 59; vertical plates 65 extending above the barrier 53 define an overflow box 67 leading from the outer peripheral wall 51 radially outward to form a zone in which liquid can not spill onto the barrier 53.

In use, the perforations 69 in the barrier 53 permit the flow of liquid through the barrier 53 but retain solids on its upper surface. However, a small percentage of the liquid flow does not pass straight through the perforations, but flows down the barrier 53. Solids retained on the barrier 53 are washed down the surface by this flow of liquid towards the central trap 55 and discharged through the base of the vessel 1 by the duct 57. Liquid flowing through the openings 59 in the barrier 53 is collected in the said liquid collection region 59 from where it flows to the overflow 19.

In the embodiment shown, the perforations 69 are circular each having a diameter of 5 mm, arranged in a triangular pattern; the free area is about 35%. This has been found to give good results in the treatment of an effluent for discharge to coastal, estuaral bathing waters to meet current UK legislation.

Figure 3:
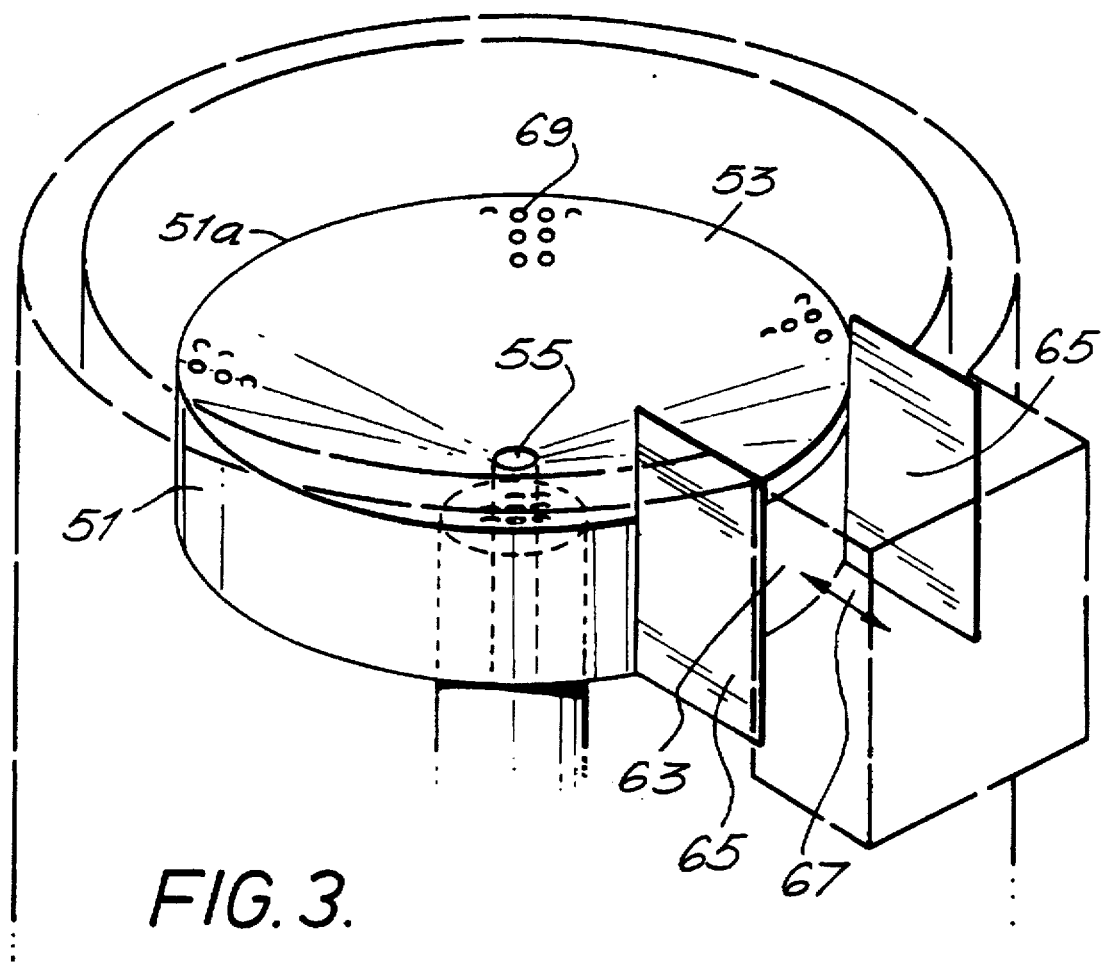
FIG. 3 is a partial perspective view of an upper region of the separator shown in FIGS. 1 and 2.
Figure 7:
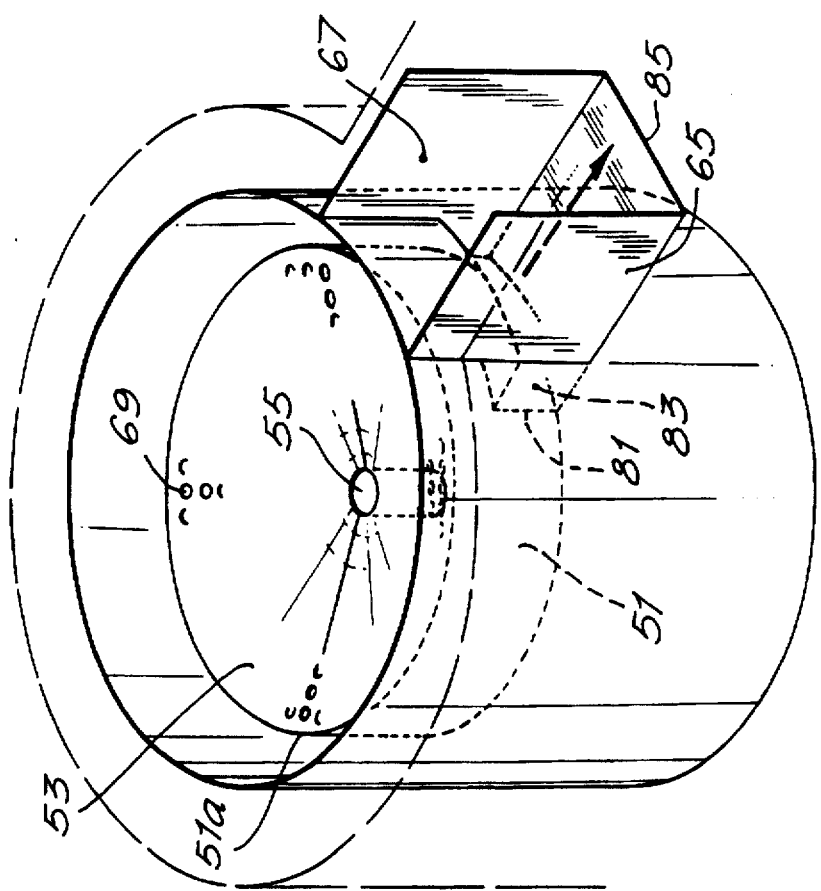
FIGS. 5 to 7 illustrate a similar separator to that shown in FIGS. 1 to 3, but with an alternative arrangement for the solids interceptor.
Figure 5:
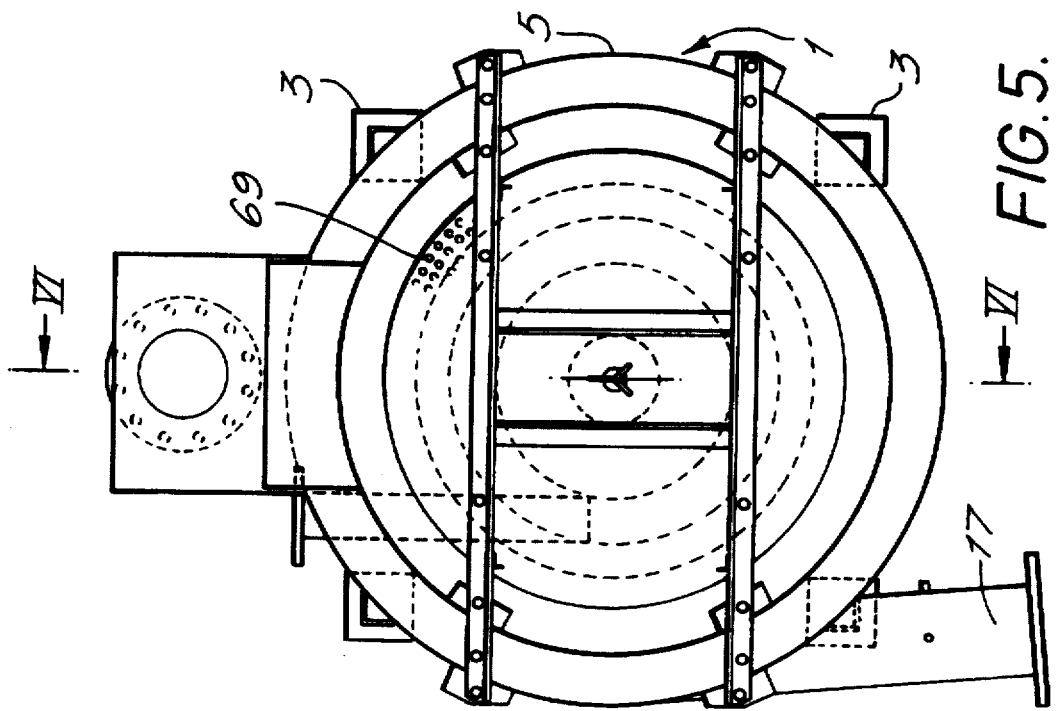
Figure 6:
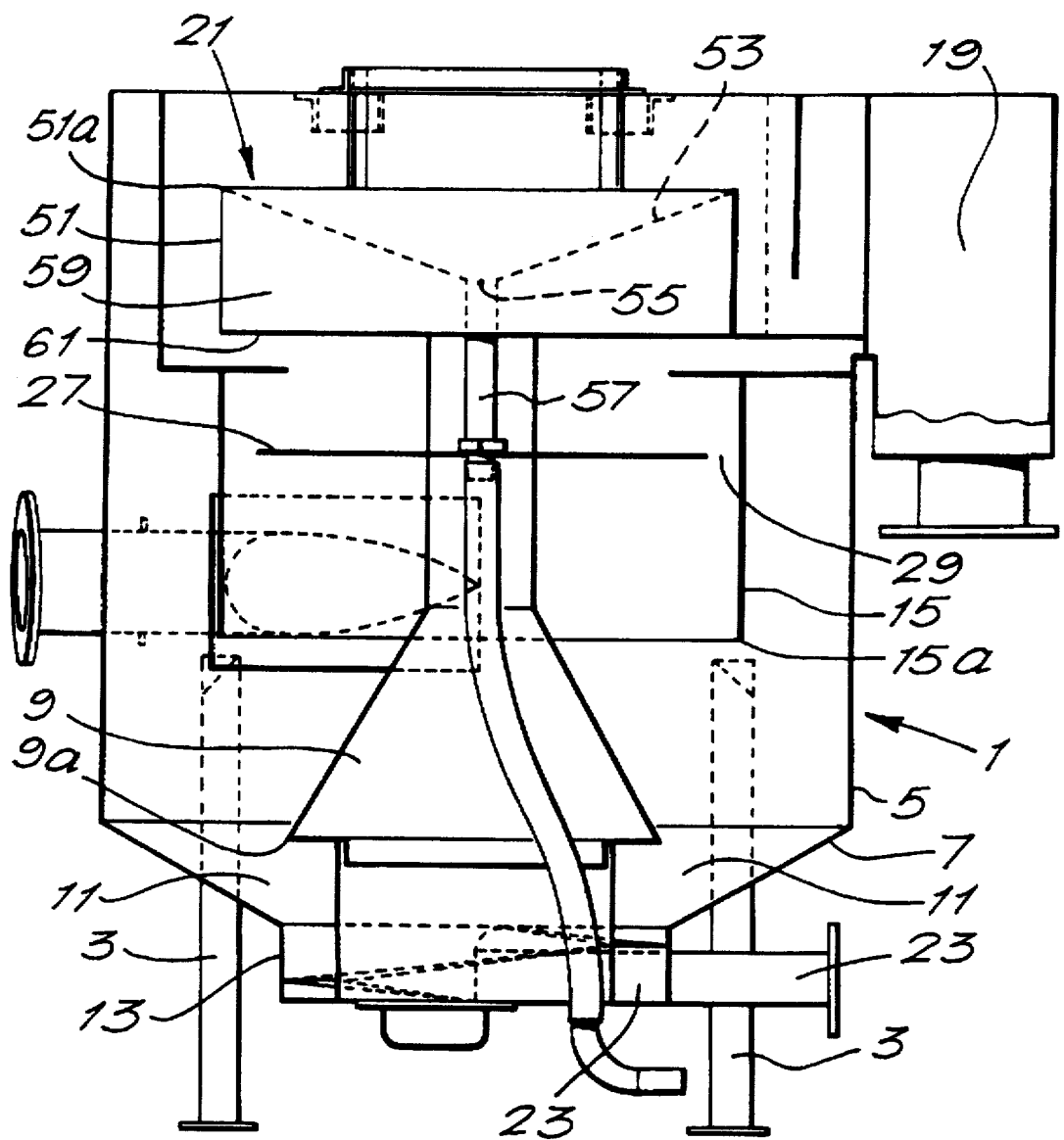

The embodiment shown in FIGS. 5 to 7 is identical with that shown in FIGS. 1 to 3 except that the outer peripheral wall 51 is fully circumferential; in this embodiment, a cut out 81 in the lower part of the outer wall 51 communicates with a duct 83 which leads to the overflow box 67 defined by the vertical plates 65 and a floor 85; the advantage of this embodiment is that liquid is able to spill over the entire circumference of the wall 51, maximising the potential of the unit. The perforations 69 in the barrier are the same as for the embodiment shown in FIGS. 1 to 3.

Figure 8:
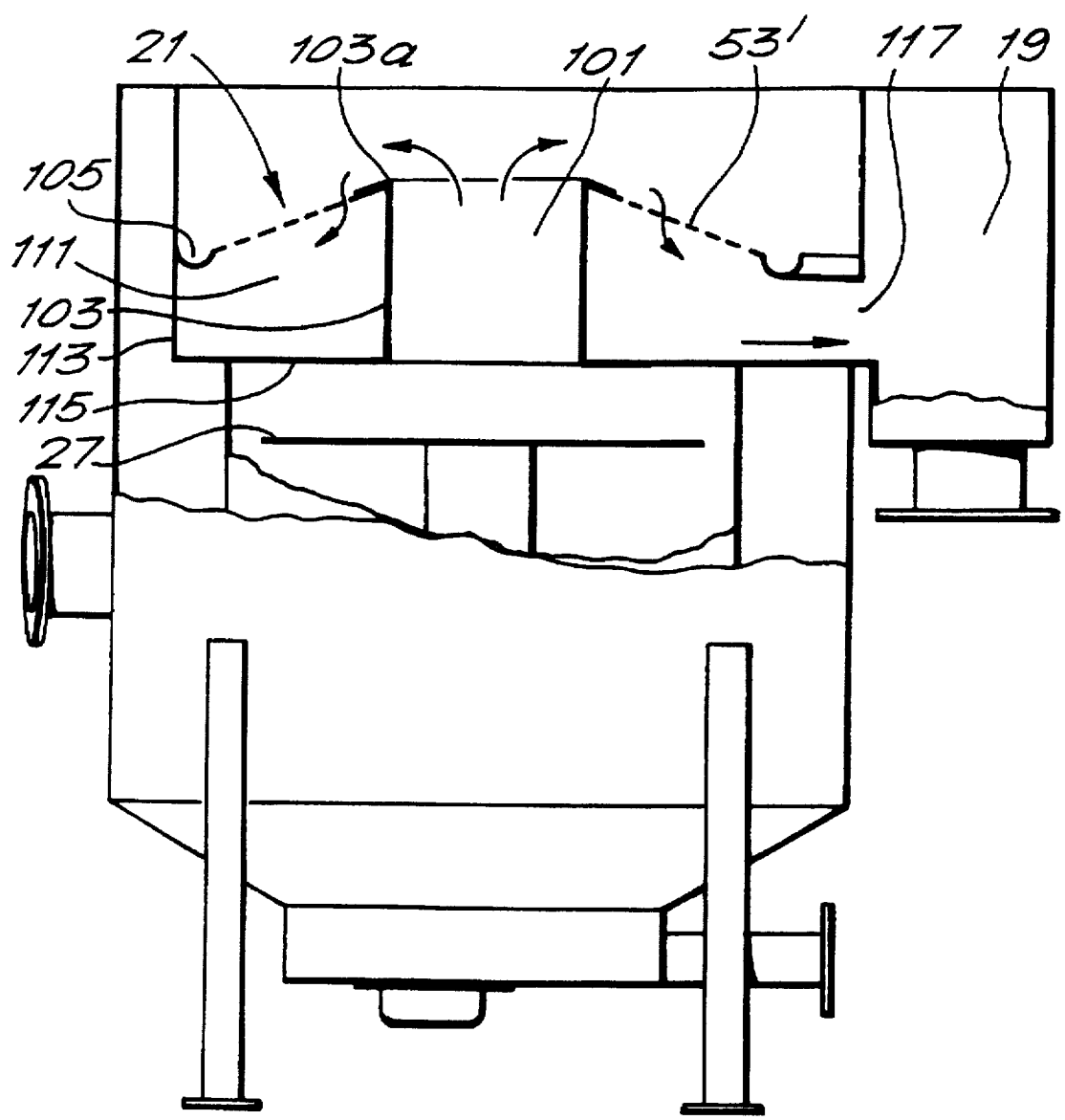
FIGS. 8 and 9 illustrate a similar separator to that shown in FIGS. 1 to 3, but with another alternative arrangement for the solids interceptor.
Figure 9:
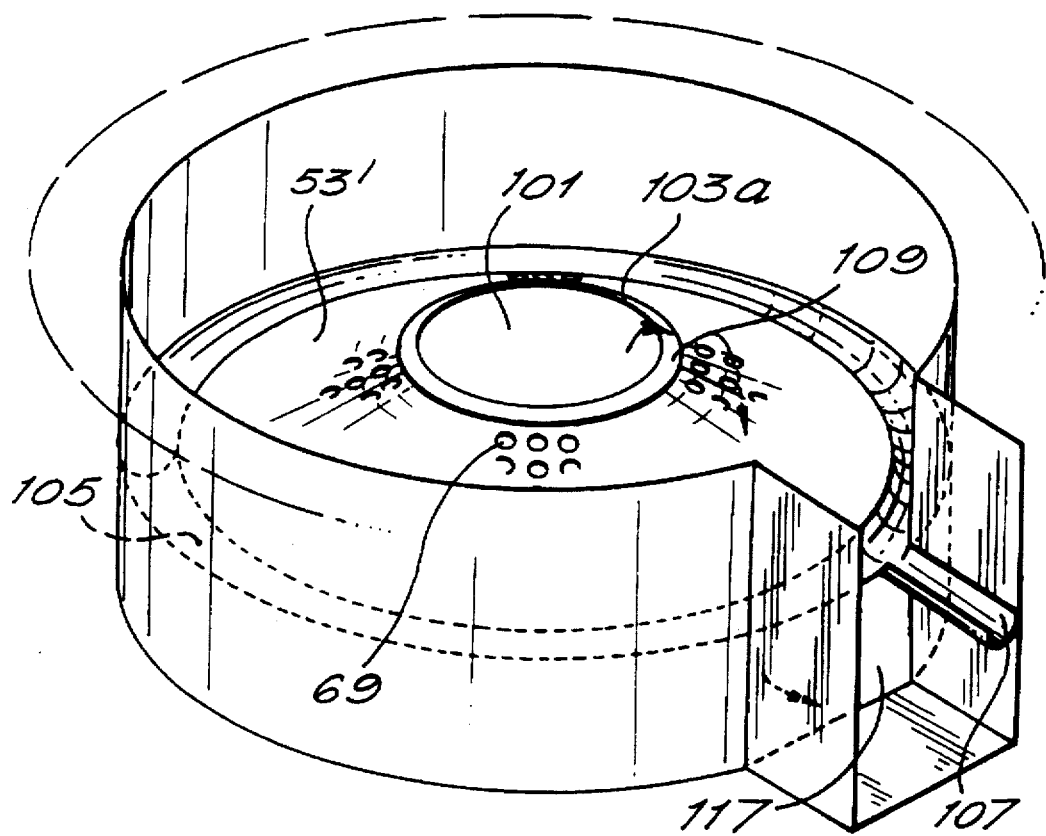

FIGS. 8 and 9 illustrate an alternative arrangement for the solids interceptor 21 in which flow is outwardly across the barrier 53. In all other respects, the apparatus is the same as the embodiments illustrated in FIGS. 1 to 3 and 5 to 7. The interceptor 21 comprises a tubular passageway 101 having an axis which coincides with the axis of the separator. The wall 103 defining the passageway 101 terminates in an edge 103a which constitutes a circular weir which is joined to the inner edge of an annular barrier 53'. The barrier 53' (which may be of the same perforated material as that used in the embodiment illustrated in FIGS. 1 to 3 or 5 to 7) slopes downwardly to a solids collection channel 105 which discharges via a channel 107 to a further screening device, for example a Franclon screen as described in GB-A-2247186. The solids collection channel 105 may itself have a slight incline towards the discharge. The barrier 53' is a perforated sheet, as previously described, an inner band 109 immediately adjacent the wall being solid to ensure flow is smooth before reaching the perforated region. The liquid passes through the perforations 69 into a liquid collection region 111 which has an outer wall 113 and a floor 115. In the outer wall 113, a section 117 is cut away for discharge of clear water to the overflow 19.

The flow of liquid across the perforated barrier 53' causes solids to be washed across the surface towards the solids collection channel 105. From the channel 105, the solids, together with the liquid which has washed the solids into the channel 105 is passed to a, screening device for dewatering.

Figure 10:
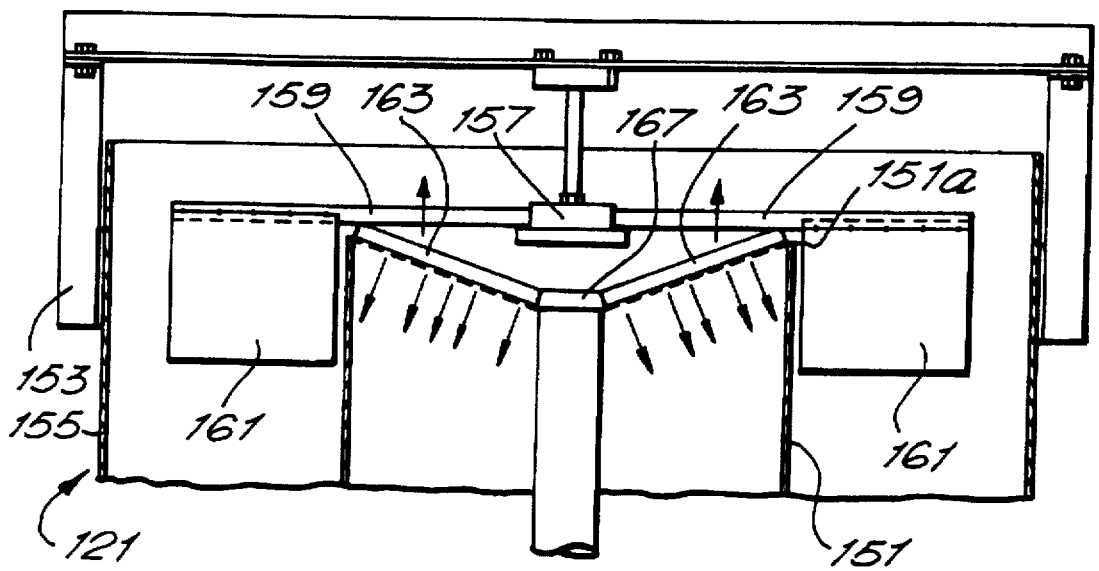
FIGS. 10 and 11 show a modification to the solids interceptor, which may be applied to a separator in accordance with the invention.
Figure 11:
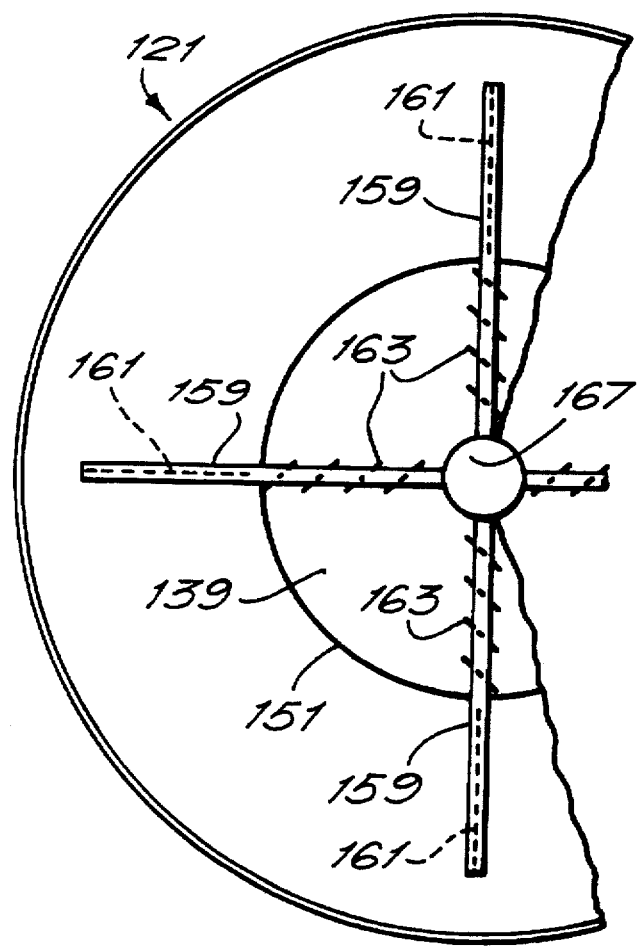

FIG. 10 is a sectional view, and FIG. 11 a partial plan view, of a solids interceptor having a modification which may be applied to any of the interceptors shown or described herein.

As before, the solids interceptor 121 has an outer peripheral wall 151, terminating in an upper edge 151a which forms a weir in the flow path of liquid flowing towards the overflow. A perforated frusto-conical barrier 139 is located radially inwardly of the wall 151.

In accordance with this modification to the solids interceptor, a support frame 153 is mounted to the vessel body 155. Mounted to the centre of the support frame 153, above the centre of the solids interceptor 121 is a bearing 157, to which is rotatably mounted an arrangement having four arms 159. Each arm 159 consists of a paddle 161 and a brush 163. The paddles 161 are suspended in the rotating flow of liquid around the solids interceptor 121, and this rotating flow of water causes the arms to rotate. Thus the brushes 163 rotate over the surface of the barrier 139. The brushes 163 are formed from angled sections 165, so that, as they rotate, they push collected solid matter towards the central collecting area 167 of the solids interceptor.

This arrangement has the advantage that, even at low flows, solid matter is reliably removed from the barrier.

It will be appreciated that any form of scraper, not merely a brush, would be suitable for use in removing the solid matter from the barrier. In addition, it will be appreciated that, depending upon the operating conditions, a single brush or scraper, or any other appropriate number of brushes or scrapers, might be satisfactory. Similarly, any number of paddles might be satisfactory, and the number of scrapers need not be the same as the number of paddles.

Figure 12:
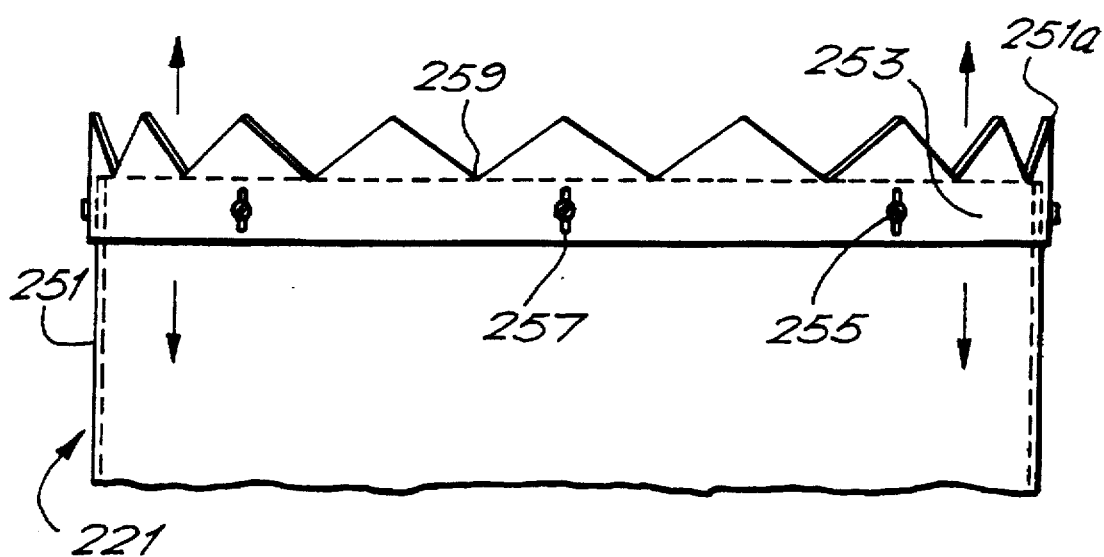
FIGS. 12 and 13 show a second modification to the solids interceptor, which may be applied to a separator in accordance with the invention.
Figure 13:
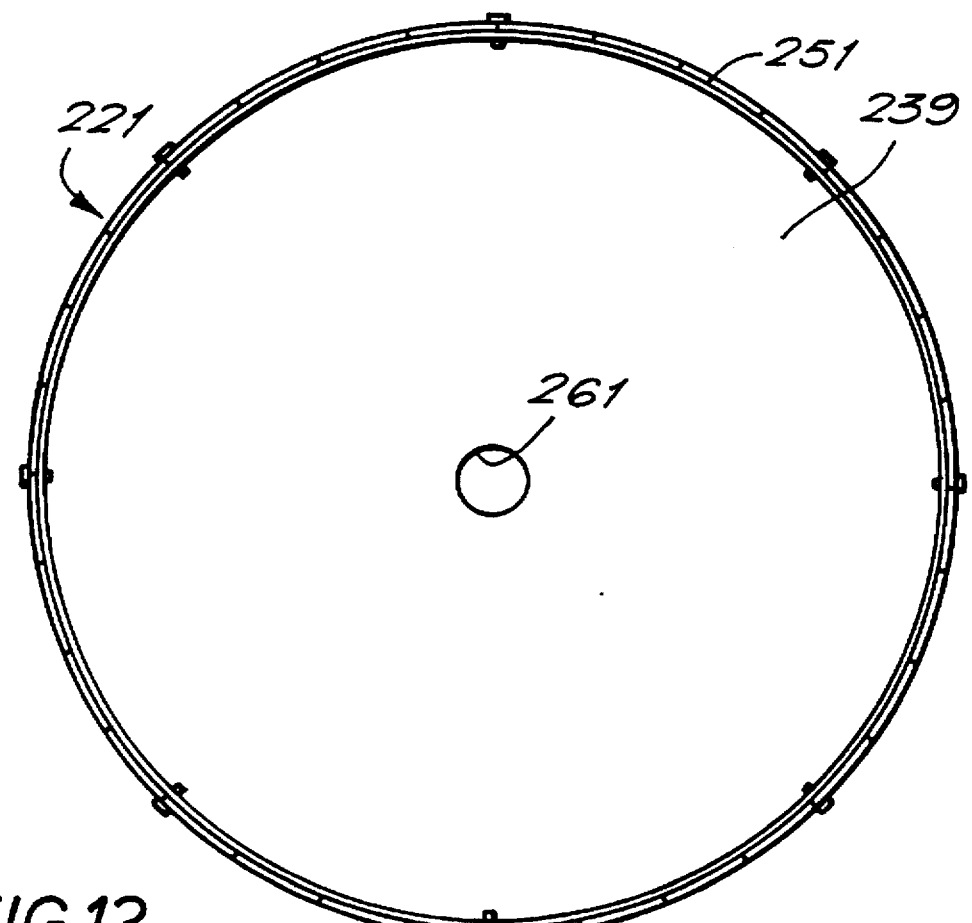

FIG. 12 is a side view, and FIG. 13 a plan view, of a solids interceptor having a further modification which may be applied to any of the devices previously shown or described. This modification may be used separately from or, preferably, in conjunction with, the modification shown in FIGS. 10 and 11.

As before, the solids interceptor 221 has an outer peripheral wall 251, terminating in an upper edge 251a which forms a weir in the flow path of liquid flowing towards the overflow. A perforated frusto-conical barrier 239 is located radially inwardly of the wall 251, and has a central collection area 261.

In accordance with this modification to the solids interceptor, an uppermost section 253 of the wall 251 is adjustably mounted to the remainder of the wall by securing screws 255, which are located in vertical slots 257, to allow the effective height of the weir to be adjusted. Moreover the upper edge 251a of the wall section 253 is formed from a series of V-notches 259. The effect of this is that, in use, flow over the weir is concentrated into those areas where the weir height is lowest.

This has the advantage that, because the flow over the weir is concentrated, the flow can be sufficient to transport the solids to the central collection area 261, even when the total flow is relatively low.

We claim:

1. A hydro-dynamic separator having an inlet for liquid and entrained solid matter and an overflow, and incorporating a solids interceptor upstream of the overflow for intercepting solid matter above a predetermined size entrained in liquid flowing towards the overflow, the solids interceptor comprising:

(a) a circular wall terminating in an upper edge which constitutes a weir in the flow path of liquid flowing to the overflow;

(b) an annular barrier, extending from the said wall towards a solids collection region, said barrier comprising a plurality of openings to permit flow of liquid therethrough but to retain solids, the upper surface of the barrier being disposed such that solids retained on the barrier are washed across the surface by the flow of liquid towards the solids collection region; and (c) a liquid collection region beneath the barrier for collecting liquid flowing through the openings in the barrier, said liquid collection region being in fluid communication with the overflow of the separator.

2. A hydro-dynamic separator according to claim 1, wherein the barrier is in the form of an annulus.

3. A hydro-dynamic separator according to claim 1, wherein the annular barrier is arranged such that flow across the barrier surface is radially inward.

4. A hydro-dynamic separator according to claim 1, wherein the said wall is an inner peripheral wall whereby flow emerges centrally of the annular barrier and passes over the wall onto the barrier thereby washing solids towards said solids collection region.

5. A hydro-dynamic separator according to claim 1, wherein flow across the barrier surface is radially outward.

6. A hydro-dynamic separator according to claim 5, wherein the wall is provided as an outer peripheral wall from which the barrier extends inward towards said central solids collection region.

7. A hydro-dynamic separator according to claim 1, wherein the upper surface of the barrier is downwardly inclined towards the solids collection region.

8. A hydro-dynamic separator according to claim 1, wherein the barrier comprises a series of longitudinal elements each extending from the said wall towards an end region disposed adjacent the solids collection region, the said elements defining openings between them for flow of liquid through the barrier.

9. A hydro-dynamic separator according to claim 1, wherein the barrier comprises a perforated plate.

10. A hydro-dynamic separator according to claim 1, further comprising:

means mounted rotatably in a region of the separator in which, in use, there exists a rotating flow of liquid; and, connected thereto:

means mounted rotatably adjacent the barrier such that rotation thereof causes solids retained on the barrier to be swept towards the solids collection region.

11. A hydro-dynamic separator according to claim 10, wherein the means mounted rotatably adjacent the barrier comprises a brush or scraper.

12. A hydro-dynamic separator according to claim 10, wherein the means mounted rotatably in a region of the separator in which, in use, there exists a rotating flow of liquid comprises at least one paddle mounted vertically, outside and adjacent the wall of the solids interceptor.

13. A hydro-dynamic separator according to claim 1, wherein the upper edge of the wall of the solids interceptor varies in height over its length.

14. A hydro-dynamic separator according to claim 13, wherein the upper edge of the wall of the solids interceptor comprises a series of V-shaped notches.

15. A hydro-dynamic separator according to claim 1, wherein the height of the upper edge of the wall of the solids interceptor is adjustable.

* * * * *